United States Patent Office 3,436,252
Patented Apr. 1, 1969

3,436,252
PAPER RELEASE COMPOSITION
Charles G. Neuroth, Blissfield, Mich., assignor to Stauffer Chemical Company, New York, N.Y., a corporation of Delaware
No Drawing. Filed Apr. 13, 1967, Ser. No. 630,515
Int. Cl. C08d *13/16;* C08g *47/02*
U.S. Cl. 117—155          7 Claims

ABSTRACT OF THE DISCLOSURE

The invention relates to a paper release composition comprising curable grafted polysiloxanes having terminal hydroxy groups or groups which are hydrolyzable by ambient moisture. In general, the curable grafted polysiloxanes are mixed with a liquid medium, applied to a substrate and thereafter cured to form a coating which will impart release characteristics thereto.

---

This invention relates to release compositions and more particularly to modified organopolysiloxanes which may be used to form a coating which will impart release properties to paper.

It is well known that paper may be coated with linear organopolysiloxanes in order to impart release characteristics thereto; however, these organopolysiloxanes do not adhere sufficiently to the paper. Furthermore, these linear organopolysiloxanes, even in the vulcanized state, swell while in contact with almost all known adhesive substances. In addition, they reduce to some extent the adhesive properties of the adhesive substances possibly due to the migration of low polymeric portion of the adhesive substrate.

On the other hand, siloxane resins adhere very well to paper; however, they do not impart desirable release properties to the coated substrate. In addition, these siloxane resin coatings are too stiff and brittle for most purposes, thus resulting in a coating which cracks, for example, when the substrate is folded.

It is therefore an object of this invention to provide paper release compositions. Another object of this invention is to provide a paper having release characteristics. Still another object of this invention is to provide paper release compositions which are flexible and resistant to cracking. Still another object of this invention is to provide release compositions which will adhere to paper. A further object of this invention is to provide a release composition which will have practically no influence on the adhesive substrate when in contact with an adhesive foil. A still further object of this invention is to provide a method for imparting release properties to paper.

The foregoing objects and others which will become apparent from the following description are accomplished in accordance with this invention, generally speaking, by providing a paper release composition comprising a curable, substantially linear organopolysiloxane having terminal hydroxy groups or groups which are hydrolyzable by ambient moisture and having at least one organic group connected by a carbon to carbon bond to the organopolysiloxane.

In other words, the curable grafted organopolysiloxane is applied to paper in the presence of a liquid medium and crosslinking agent and thereafter cured to form a coating which is elastic, adheres to the substrate and has practically no influence on an adhesive substance when in contact with an adhesive foil.

The method of this invention contemplates the application to paper or other plain surface substrate a release agent based on hydroxy-terminated grafted polysiloxanes of the formula

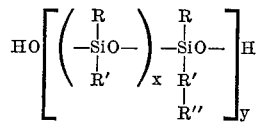

wherein R and R' are organic groups, which may be the same or different, having from 1 to 18 carbon atoms, R'' is a monomeric or polymeric group grafted to the organic groups represented by R or R' above, x is an integer of from 1 to 1,000 and y is an integer of from 1 to 100.

The polymeric group represented by R'' above comprising monomers, polymers and copolymers is reacted in the presence of a catalyst with organopolysiloxanes represented broadly by the formula

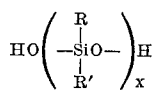

wherein R and R' are the same as those represented above and are selected from the group consisting of alkyl, cycloalkyl, aryl, alkoxy, cycloalkoxy and aryloxy groups and x is the same as that represented above. Of the different organopolysiloxanes, the alkylpolysiloxanes are preferred, preferably the lower alkylpolysiloxanes and more preferably polydimethylsiloxanes.

Organic monomeric compounds which may be used in the formation of the grafted organopolysiloxanes included both branched and straight chained monomeric olefins having from 1 to 18 carbon atoms such as ethylene, propylene, butylene, isobutylene, isoprene, butadiene, hexylene, octylene, 1-decene, dodecene, tetradecene, hexadecene, octadecene; unsaturated aromatic hydrocarbons such as styrene, alpha-methylstryene, alpha-ethylstyrene, alpha-butylstyrene, vinyl toluene and the like. Other monomeric compounds which may be used are the halogenated mono-olefinic hydrocarbons such as chloroprene, chlorostyrene, alpha-bromostyrene, 2,5-dichlorostyrene, 2,5-dibromostyrene,
3,4-dichlorostyrene, 3,4-difluorostyrene, ortho, meta and parafluorostyrenes, 2,6-dichlorostyrene, 2,6-difluorostyrene, 3-chloro-4-fluorostyrene, 2,4,5-trichlorostyrene, dichloro-mono-fluorostyrene, chloroethylene, 1,1-dichloroethylene, phenylethylene, fluoroethylene, iodoethylene, 1,1-dibromoethylene, 1,1-difluoroethylene, 1,1-diiodoethylene and the like. Examples of unsaturated acids which may be used are vinyl acetic acid, acrylic acid, methacrylic acid, crotonic acid, 3-butenoic acid, cinnamic acid, maleic acid, trimethyl maleic acid, lauric acid, oleic acid, linoleic acid, lenolenic acid and the like. Other compounds which may be used are esters of organic acids such as vinyl acetate, vinyl propionate, vinyl butyrate, vinyl isobutyrate, vinyl valerate, vinyl caproate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, actyl methacrylate, decyl methacrylate, methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, actyl acrylate, 3,5,5-trimethylhexyl acrylate, decyl acrylate and dodecyl acrylate, tetra-decyl acrylate, octodecyl acrylate, isopropenyl acetate, isopropenyl propionate, isopropenyl butyrate, isopropenyl isobutyrate, isopropenyl valerate, isopropenyl caproate, isopropenyl benzoate, isopropenyl p-chlorobenzoate, isopropenyl o-bromobenzoate, isopropenyl m-chlorobenzoate, isopropenyl toluate, isopropenyl alpha-chloroacetate, isopropenyl alpha-bromopropionate, vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate, vinyl alpha-bromovalerate, allyl chlorocarbonate, allyl formate, allyl acetate, allyl propionate, allyl butyrate, allyl valerate, allyl caproate, diallyl phathalate, diallyl succinate, diethylene glycol bis-(allyl carbonate), allyl-3,5,5-trimethylhexoate, diallyl adipate, diallyl subacate, diallyl fumarate, allyl benzoate, allyl acrylate, allyl crotonate, allyl oleate, allyl chloroacetate, ally trichloroacetate, allyl chloropropionate, allyl chlorovalerate, allyl lactate, allyl pyruvate, allyl aminoacetate, allyl acetoacetate, allyl thioacetate, as well as methyl esters corresponding to the above allyl esters. Other vinyl compounds which may be used are the vinyl aromatics such as vinyl pyridine, vinyl naphthylene, divinyl benzene, as well as vinyl silicone compounds such as vinyl triethoxysilanes.

In addition, organic nitriles such as acrylonitrile, methacrylonitrile, ethacrylonitrile, crotonitrile and the like may be used in the formation of grafted polysiloxanes.

As emphasized previously, the monomers may be used singly or in combinations of two or three or even more. Exceptional results have been achieved by the use of styrene and substituted styrenes in conjunction with acrylates and methacrylates. Examples of styrene acrylate combinations which have been successfully grafted to hydroxy-terminated polydimethylsiloxanes and have provided a satisfactory release composition are styrene-butyl acrylate, styrene-butyl methacrylate, styrene-2-ethylhexyl acrylate, styrene-2-ethylhexyl acrylate-butyl acrylate, styrene-ethyl methacrylate, styrene-isobutyl methacrylate and the like.

Grafting of the monomeric or polymeric groups to the organopolysiloxanes is expeditiously carried out by using a free-radical initiator, normally a peroxide. As little as 0.05 percent of the more active peroxide initiators based on the weight of reactants is adequate in most cases. Where increased reaction rates are desired, as much as 2 percent or even more of the initiator may be used. In general, it is advisable not to exceed about 1.0 percent, since higher concentrations tend to promote coupling reactions which understandably increase the viscosity of the reaction mixture.

In using a free-radical initiator, the reaction, when carried out in a batch-wise process, generally proceeds at a satisfactory rate if the temperature is maintained in a range from about 60° C. to 130° C. If a continuous process is used or if the reaction is carried out batch-wise without a free-radical initiator, substantially higher temperatures, such as, up to about 160° C. may be advantageously employed.

Examples of suitable peroxide initiators are those having at least one of the peroxide oxygens attached to a tertiary-carbon atom such as dialkyl peroxides, i.e., di-tert-butyl and dicumyl peroxide; hydroperoxides such as tert-butyl hydroperoxide, cumyl hydroperoxide and decylene hydroperoxides; cyclic peroxides such as ascaridole and 1,5-dimethylhexane-1,5-peroxide; and peresters such as tertiary-butyl perbenzoate, tertiary-butyl peroxyisopropylcarbonate and tertiary-butyl peroctoate. Other peroxides which may be used are ketone peroxides such as acetone peroxide and cyclo-hexanone peroxide.

Acyl peroxides and peracids may be used as initiators in the formation of graft polymers. However, these initiators result in less grafting, i.e., lower yields of the grafted product. The difference is believed to lie in the nature of the radicals produced, thus tertiary-alkoxy radicals from di-tertiary-butyl peroxide, for example, have a strong tendency to extract hydrogen atoms which is a necessary step in the grafting procedure. On the other hand, acyloxy radicals produced from acyl peroxide, e.g., benzoyl peroxide, while effective initiators are relatively ineffective as hydrogen extractors.

Although it may be possible to carry out the grafting procedure using organopolysiloxane material free of terminal hydroxy groups or groups hydrolyzable by ambient moisture and to subsequently treat the graft polymer to incorporate such groups, it is preferred in the grafting operation to start with an organopolysiloxane having terminal hydroxy groups. Following this procedure, the grafted polymer is appropriately treated to convert the hydroxy groups to groups which are hydrolyzable by ambient moisture.

The hydroxy organopolysiloxane material may contain in minor proportions molecules having only one hydroxy group or there may be a smaller number of molecules carrying in excess of two hydroxyl groups. It is preferred, in any event, that the hydroxy organopolysiloxane material have on the average from about 1.75 to about 2.25 hydroxyl groups per molecule.

It is believed that the chain length of the polysiloxane is important, although grafting has been found to occur in siloxanes of almost any chain length. Where the siloxane material contains molecules of short chain length, many of these will remain ungrafted. On the other hand, very long chain length material results in a graft product which is extremely viscous and difficult to handle in various applications. Therefore, it is preferred that the hydroxy polysiloxanes have a degree of polymerization of between about 100 and 5,000 which is equivalent to a viscosity of between about 100 and 50,000 centipoises. Most preferably, the viscosity of the hydroxy polysiloxanes should lie within the range of from about 200 to 10,000 centipoises. In cases where an easily pourable grafted product is desired, then it is preferred that the viscosity be in the range of from about 300 to 1,000 centipoises.

The proportion of organic monomer or polymer used in the grafting reaction may be varied within wide limits; however, it has been found that greatly improved physical properties have been obtained where the reaction mixture contains from about 25 to about 75 percent by weight of organic monomers or polymers. It is preferred that the organic monomer or copolymer portion account for from about 40 to 65 percent of the total weight of the reactants.

Generally these paper release compositions are prepared by first mixing hydroxy-terminated grafted polysiloxanes in an inert liquid medium and thereafter adding a cross-linking agent prior to its application to a paper substrate. However, it is also possible to add the cross-linking agent to the liquid medium prior to the addition of the grafted polysiloxane. In addition, it has been found in some cases that the paper release characteristics may be substantially improved if the hydroxy-terminated grafted polysiloxane is mixed with a liquid medium which is preferentially a solvent for the grafted polysiloxane and a nonsolvent for the organic groups grafted thereto. The composition thus formed, which may be either a solution or an emulsion, is then mixed with a cross-linking agent and applied in known manner. Where the composition is a solution, it may be applied to the paper substrate by spraying or dipping in a conventional coating device and dried at temperatures from about 25° C. to about 120° C., preferably from about 30° to 70° C. On the other hand, where the paper is treated with an emulsion, the paper web may be sprayed with the emulsion and squeezed in a sizing press to remove the excess emulsion and thereafter dried.

Examples of cross-linking agents which may be used in a one-component system are silanes of the general formula $$(R''')_n Si(X)_{4-n}$$

wherein $R'''$ is a relatively inert group such as alkyl, alkoxy or aryl group, X is a group readily hydrolyzable by ambient moisture such as acyloxy, oximo, dialkyl aminooxy and the like and $n$ is an integer equal to 1 or 2. The acyloxy group represented by X above may be any saturated aliphatic mono-acyl radical such as propionyl, butyryl, hexoyl, 2-ethylhexoyl, octanoyl, isovaleryl and stearyl. Examples of alkyl groups represented by R''' above are methyl, ethyl, butyl, tert-butyl, hexyl, decyl, dodecyl, octadecyl and the like. Examples of aryl groups are phenyl, tolyl, xylyl, naphthyl and the like. Exemplary of such silanes are methyltriacetoxysilane, isopropoxytriacetoxysilane, methyltriacetoximosilane, methyltrisdiethylaminooxysilane, ethyltriacetoxysilane, dimethoxydiacetoxysilane, dipropoxydiacetoxysilane, dibutoxydiacetoxysilane and the like.

In a two-component system, the grafted organopolysiloxanes are mixed with a cross-linking agent and a catalyst, the latter generally being added just prior to use. In this system the cross-linking agent is either a polyalkoxysilane of the formula

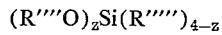

or a polyalkoxysiloxane in which the silicon atoms are linked through Si—O—Si linkages and the remaining valences of the silicon atom are satisfied by R''''O and R'''''. In the above formula, the groups represented by R'''' are monovalent hydrocarbon radicals having up to 8 carbon atoms, while those represented by R''''' are monovalent hydrocarbon or halogenated hydrocarbon radicals having up to 8 carbon atoms and $z$ is an integer of from 3 to 4. Examples of monovalent hydrocarbon radicals represented by R'''' are methyl, ethyl, propyl, butyl, hexyl, octyl, phenyl, vinyl, allyl, ethylallyl, butadienyl and the like. Radicals represented by R''''' may be the same as those represented by R''', as well as the corresponding halogenated groups such as chloromethyl, 2-bromo-4,6-diiodophenyl, 1,2-difluorovinyl, 3,4-difluorocyclopentyl, 2-bromocyclopentene-2,3-yl and 6-chlorohexyl.

The polyalkoxysilanes used herein include monoorganotrihydrocarbonoxysilanes, tetra - hydrocarbonoxysilanes, e.g., ortho silicates and partial hydrolyzates of such silanes. The polyalkoxy compounds, e.g., ethyl orthosilicate or a partially hydrolyzed ethyl silicate such as ethyl silicate "40" which consists primarily of decaethyl tetrasilicate are representative of these compounds.

The polyalkoxysilanes and polyalkoxysiloxanes, which may be used either alone or in combination, should be used in an amount of from about 0.5 to about 10 percent, preferably from about 1 to 5 percent by weight based on the weight of the grafted organopolysiloxane. If the total weight of the polyalkoxysilanes or polyalkoxysiloxanes is below about 0.2 percent based on the weight of the grafted organopolysiloxane, very little cross-linking will occur. If, on the other hand, the total weight of the polyalkoxysilanes or siloxanes is above about 10 percent based on the weight of the grafted organopolysiloxane, the curing time will not be substantially reduced.

In addition, it is essential that a metal salt of a carboxylic acid or dibutyltin butoxychloride be used as a catalyst to promote curing of these grafted polysiloxanes in the two-component system. Examples of metals which may be used are lead, tin, nickel, cobalt, iron, cadmium, chromium, zinc and the like. Examples of suitable curing catalysts are dibutyltindilaurate, dibutyltinbutoxychloride, dibutyltindilactate, cobalt naphthenate, chromium octoate, dibutyltinbenzoate and the like. The amount of catalyst used is determined by the cure rate desired. Generally, from about 0.5 to about 1.0 percent based on the weight of the grafted organopolysiloxane and cross-linking agent is sufficient.

Various organic solvents and emulsifying agents may be used as a liquid medium for applying these release compositions to paper. Examples of these solvents are halogenated aliphatic hydrocarbons such as carbon tetrachloride, chloroform and dichloromethane; aromatic hydrocarbons such as benzene, toluene, xylene and the like. Other solvents and emulsifying agents which may be employed are the aliphatic hydrocarbons such as pentane, neopentane, hexane, heptane; organic ethers such as diethyl ether, diisopropyl ether, dibutyl ether, amyl ether and the like; ketones such as ethylisobutyl ketone and the like. Other organic compounds which may be used as a liquid medium are polyethylene glycol, cellulose ethers, polyvinyl alcohol, polyacrylamides, aliphatic fluorocarbons and low boiling siloxanes.

Generally, the coating will contain from about 1 to 10 percent, preferably from about 2 to 5 percent of the grafted polysiloxane polymer based on the weight of the solvent or emulsifying agent. Often times when the concentration is above about 5 percent, the coating composition may become very viscous and extremely difficult to apply to the paper substrate.

The papers and foils of the present invention are very repellent toward adhesives and sticky substances of all kinds and in addition, have a very hydrophobic character. In addition, these coating compositions do not materially effect the adhesive substances of adhesive foils whose adhesive power remains practically unimparied.

Various aspects of the invention are further illustrated by the following examples which are not to be taken as in any way limiting the scope thereof. In the examples all parts are by weight, unless otherwise specified.

PREPARATION OF GRAFTED POLYSILOXANES

Example 1

Approximately 79 parts of styrene, about 97 parts of butylacrylate, about 118 parts of a hydroxy-terminated polysiloxane and about 0.8 part of ditert-butyl peroxide are added to a stainless-steel reactor with agitation under an atmosphere of nitrogen. The reactants are heated to a temperature of about 120° C. over a period of about 45 minutes and maintained between 120° C. and 130° C. for about 6.5 hours. The crude product is then cooled to about 65° C. and the unreacted monomers are removed at a temperature of about 100° C. at about 5 mm. Hg vacuum. Approximately 92.1 percent of the monomers are converted and the product has a viscosity of about 6,600 cps. at 25° C.

Example 2

To a stainless-steel reactor are added about 128 parts of butylacrylate, about 85.5 parts of a hydroxy-terminated polydimethylsiloxane having a viscosity of 400 cps., about 0.64 gram of tert-butyl peroctoate under agitation and a nitrogen atmosphere. The temperature of the reactants is maintained at about 80° C. for approximately 4 hours. The unreacted monomers are removed at a temperature of about 100° C. at about 5 mm. Hg vacuum, yielding a product having a viscosity of about 7,800 cps. at 25° C.

Example 3

To a stainless-steel reactor are added about 100 parts of ethylacrylate, about 66.7 parts of a hydroxy-terminated polydimethylsiloxane having a viscosity of about 400 cps. and about 0.5 part of tert-butyl peroctoate under an atmosphere of nitrogen. The reactants are heated to a temperature of about 80° C. for a period of about 4 hours with agitation. The unreacted monomers are then removed at a temperature of about 100° C. at about 5 mm. Hg vacuum. The product has a viscosity of about 12,000 cps. at 25° C.

Example 4

To a stainless-steel reactor are added about 104 parts of styrene, about 69.4 parts of a hydroxy-terminated polydimethylsiloxane (400 cps.) and about 0.5 part of ditert-butyl peroxide under a nitrogen atmosphere with agitation. The reactants are heated to a temperature of about 130° C. for a period of about 4 hours. The unreacted monomers are removed at a temperature of about 100° C. under a vacuum of about 5 mm. Hg. The recovered product has a viscosity of about 11,800 cps.

Example 5

To a stainless-steel reactor are added about 41.6 parts of styrene, about 77 parts of butylacrylate, about 78.1 parts of hydroxy-terminated polydimethylsiloxane (400 cps.) and about 0.5 part of ditert-butyl peroxide in accordance with Example 4. The recovered product has a viscosity of about 8,800 cps.

Example 6

Approximately 20.8 parts of styrene, about 102.6 parts of butylacrylate, about 82.3 parts of hydroxy-terminated polydimethylsiloxane (400 cps.) and about 0.62 part of ditert-butyl peroxide are added to a reactor in accordance with the procedure described in Example 4. The recovered product has a viscosity of about 7,800 cps.

Example 7

Approximately 166 parts of stearyl methacrylate, about 166 parts of hydroxy-terminated polydimethylsiloxane (400 cps.), about 90 parts of benzene and about 0.83 part of tert-butyl peroctoate are added to a reactor in accordance with the procedure described in Example 4. The reactants are maintained at a temperature of about 80° C. for a period of about 5.5 hours. The solvent and unreacted monomers are removed under vacuum and a product is recovered having a viscosity of 4,880 cps.

Example 8

Approximately 350 parts of a hydroxy-terminated polydimethylsiloxane (6,700 cps.), about 45 parts of vinyl chloride and about 1.7 parts of tertiary-butyl peroctoate are added to a stainless-steel reactor under a nitrogen atmosphere with agitation. The mixture is reacted at about 80° C. for about 4 hours, yielding a product which is a clear, pale purple fluid.

Example 9

Approximately 66.5 parts of hydroxy-terminated polydimethylsiloxane (400 cps.), about 90.1 parts of ethylacrylate, about 9.7 parts of vinylidene chloride and about 0.5 part of tertiary-butyl peroctoate are added to a stainless-steel reactor under a nitrogen atmosphere with agitation. The reaction mixture is heated to about 80° C. for a period of about 5 hours. The unreacted monomers are removed under vacuum and a product is recovered having a viscosity of about 12,000 cps.

Example 10

Approximately 65.5 parts of hydroxy-terminated polydimethylsiloxane (800 cps.), about 77 parts of butylacrylate, about 21.2 parts of acrylonitrile and about 0.5 part of tertiary-butyl peroctoate are introduced into a stainless-steel reactor under a nitrogen atmosphere with agitation. The reaction mixture is heated to between about 70° C. and 75° C. for a period of about 4 hours. The unreacted monomers are removed under vacuum and a product is recovered having a viscosity of about 84,200 cps.

PREPARATION OF RELEASE COMPOSITIONS

Example 11

To approximately 5 parts of the polymer prepared in accordance with the procedure described in Example 1 are added about 95 parts of methylene chloride, about 0.5 part of ethyl silicate "40" and about 0.1 part of dibutyltinbutoxychloride with agitation. A piece of kraft paper is divided into two portions; one portion of which is dipped into the release composition. The excess is removed and the treated paper is dried at a temperature of about 70° C. A sample of hot melt adhesive (obtained from the H. B. Fuller Company) is applied to both portions of the kraft paper and cooled. The portion of the paper covered with the release composition exhibits excellent release characteristics while the adhesive continues to adhere to the untreated area.

Example 12

In accordance with the procedure described in Example 11, approximately 5 parts of the polymer prepared in accordance with the description of Example 2 are added to about 95 parts of methylene chloride, about 0.5 part of ethyl silicate "40" and about 0.1 part of dibutyltinbutoxychloride. Kraft paper treated with this release composition exhibits excellent release properties while the adhesive continues to adhere to the untreated paper.

Example 13

A piece of kraft paper is treated with the composition of Example 3 in accordance with the procedure described in Example 11. The portion of the paper treated with the release composition exhibits excellent release properties.

Example 14

A piece of kraft paper is treated with the composition of Example 4 in accordance with the procedure described in Example 11. The portion of the paper treated with this composition exhibits excellent release properties while the adhesive continues to adhere to the untreated portion.

Example 15

A piece of kraft paper is treated with the composition of Example 6 in accordance with the procedure described in Example 11. The portion of the paper treated with this release composition exhibits excellent release properties, whereas the untreated portion does not exhibit these release characteristics.

Example 16

A piece of kraft paper is treated with the composition of Example 7 in accordance with the procedure described in Example 11. The portion of the paper treated with this release composition exhibits excellent release properties while the untreated portion does not exhibit these release properties.

Example 17

A piece of kraft paper is treated with the composition of Example 8 in accordance with the procedure described in Example 11. The hot melt adhesive is immediately released from the treated portion while it continues to adhere to the untreated portion.

Example 18

A piece of kraft paper is treated with the composition of Example 9 in accordance with the procedure described in Example 11, except that hexamethyldisiloxane is substituted for the methylene chloride as the solvent medium. The hot melt adhesive is released from the treated portion but continues to adhere to the untreated portion.

In a similar experiment, a piece of kraft paper is treated solely with hexamethyldisiloxane, dried and then coated with the hot melt adhesive. The treated kraft paper, treated solely with hexamethyldisiloxane, does not exhibit any release characteristics towards the hot melt adhesive.

Example 19

A piece of kraft paper is treated with the composition of Example 10 in accordance with the procedure described in Example 11, except that hexamethyldisiloxane is substituted for the methylene chloride as the solvent medium. The treated portion exhibits release characteristics, whereas the adhesive continues to adhere to the untreated portion.

Example 20

To approximately 5 parts of the polymer prepared in accordance with the procedure described in Example 1 are added about 95 parts of methylene chloride and about 0.5 part of vinyltriacetoxysilane with agitation. A piece of kraft paper is dipped in the composition and dried at a temperature of about 40° C. A sample of hot melt adhesive (obtained from the H. B. Fuller Company) is applied to the treated paper and cooled. The treated paper exhibits excellent release properties.

In a similar experiment, the hot melt adhesive is applied to untreated kraft paper. The untreated kraft paper does not exhibit any release properties towards the hot melt adhesive.

When the above examples are repeated utilizing other monomers and mixtures of monomers with the hydroxy-terminated polysiloxanes in the presence of other catalysts, polymers are obtained which are, in general, substantially equivalent to those of the specific examples.

Although specific examples of the invention have been herein described, it is not intended to limit the invention solely thereto, but to include all the variations and modifications falling within the spirit and scope of the appended claims.

The invention claimed is:

1. A method for imparting release properties to paper which comprises applying to the paper a composition containing an inert organic solvent, a hydroxyl-terminated diorganopolysiloxane wherein the organo groups have from 1 to 18 carbon atoms and having at least one polymeric organic side chain connected to a silicon atom via an alkylene group, said polymeric organic side chain being constituted of recurring units derived from olefins selected from the class consisting of branched and straight chain olefins of from 2 to 18 carbon atoms whether or not attached to an aromatic nucleus, halogenated olefins again whether or not attached to an aromatic nucleus, unsaturated acids, esters of organic acids in which either the esterifying group or the derivative acid is unsaturated, unsaturated amides and unsaturated nitriles, and at least 0.5 percent by weight based on the weight of the organopolysiloxane of a silane meeting the formula:

$$R'''_nSiX_{4-n}$$

where $R'''$ is selected from the group consisting of alkyl, alkoxy, and aryl radicals; X is a hydrolyzable group and n is equal to 1 to 2, and thereafter drying the thus coated paper at a temperature sufficient to remove the solvent.

2. The method of claim 1 wherein the organopolysiloxane is represented by the formula

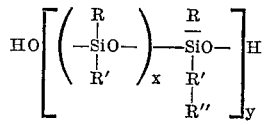

wherein R and R' are organic groups having from 1 to 18 carbon atoms, R" represents the said polymeric organic side chain, x is an integer of from 1 to 1,000 and y is an integer of from 1 to 100.

3. The method of claim 1 where the inert solvent is selected from the class consisting of aliphatic hydrocarbons, aromatic hydrocarbons, halogenated aliphatic hydrocarbons, ethers, glycols, aliphatic fluorocarbons, polyacrylamides, and low boiling siloxanes.

4. The method of claim 1 wherein the organopolysiloxane is present in an amount of from about 1 to about 10 percent based on the weight of the solvent.

5. The method of claim 1 wherein the composition contains a catalyst selected from the group consisting of metal salts of carboxylic acids and dibutyltin butoxychloride, and the cross-linking agent is selected instead from the class consisting of polyalkoxysiloxanes in which the silicon atoms are linked through Si—O—Si linkages and polyalkoxysilanes of the formula:

$$(R''''O)_zSiR''''''_{4-z}$$

where $R''''$ is a monovalent hydrocarbon radical having up to 8 carbon atoms, $R''''''$ is selected from the group consisting of monovalent hydrocarbon radicals and halogenated monovalent hydrocarbon radicals having up to 8 carbon atoms and z is a number of from 3 to 4.

6. A paper having release properties provided by a coating composition comprising a siloxy cross-linked organopolysiloxane wherein the organo groups have from 1 to 18 carbon atoms having at least one polymeric organic side chain connected to a silicon atom of the organopolysiloxane via an alkylene group, said polymeric organic side chain being constituted of recurring units derived from olefins selected from the class consisting of branched and straight chain olefins of from 2 to 18 carbon atoms whether or not attached to an aromatic nucleus, halogenated olefins again whether or not attached to an aromatic nucleus, unsaturated acids, esters of organic acids in which either the esterifying group or the derivative acid is unsaturated, unsaturated amides and unsaturated nitriles.

7. A paper conforming to claim 6 where the organopolysiloxane comprises substantially linear units of the formula

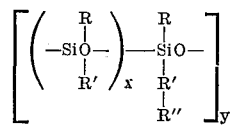

wherein R and R' are organic groups having from 1 to 18 carbon atoms; R" represents the said polymeric organic side chain; x is an integer of from 1 to 1,000 and y is an integer of from 1 to 100.

References Cited

UNITED STATES PATENTS

| | | | |
|---|---|---|---|
| 3,296,195 | 1/1967 | Goossens | 260—46.5 |
| 3,318,898 | 5/1967 | Boissieras et al. | 260—46.5 |
| 3,361,714 | 1/1968 | Omietanski et al. | 260—46.5 |
| 2,985,546 | 5/1961 | Leavitt. | |
| 3,127,363 | 4/1964 | Nitzsche et al. | |
| 3,132,167 | 5/1964 | Boot et al. | 260—46.5 |
| 3,133,110 | 5/1964 | Morehouse et al. | 260—46.5 |
| 3,159,600 | 12/1964 | Watkins | 260—46.5 |
| 3,161,614 | 12/1964 | Brown et al. | |
| 3,186,964 | 6/1965 | Kookootsedes et al. | |
| 3,179,622 | 4/1965 | Haluska. | |
| 3,328,482 | 6/1967 | Northrup et al. | 117—155 |
| 3,337,497 | 8/1967 | Bostick | 260—46.5 |
| 3,305,502 | 2/1967 | Lampe. | |

OTHER REFERENCES

Condensed Chemical Dictionary, 5th edition, 1956, p. 881, Reinhold Publishing Co.

DONALD E. CZAJA, *Primary Examiner.*

M. I. MARQUIS, *Assistant Examiner.*

U.S. Cl. X.R.

117—76, 161; 260—18, 32.8, 33.2, 33.4, 33.6, 33.8, 46.5, 827

UNITED STATES PATENT OFFICE
CERTIFICATE OF CORRECTION

Patent No. 3,436,252 April 1, 196

Charles G. Neuroth

It is certified that error appears in the above identified patent and that said Letters Patent are hereby corrected as shown below:

Column 4, line 40, "copolymer" should read -- polymer -

Signed and sealed this 7th day of April 1970.

(SEAL)
Attest:

Edward M. Fletcher, Jr.
Attesting Officer

WILLIAM E. SCHUYLER,
Commissioner of Pat